(12) United States Patent
Sparks

(10) Patent No.: US 8,352,576 B2
(45) Date of Patent: Jan. 8, 2013

(54) MEDIA FILE ACCESS

(75) Inventor: David L. Sparks, Cupertino, CA (US)

(73) Assignee: Google Inc., Mountain View, CA (US)

( * ) Notice: Subject to any disclaimer, the term of this patent is extended or adjusted under 35 U.S.C. 154(b) by 127 days.

(21) Appl. No.: 12/946,732

(22) Filed: Nov. 15, 2010

(65) Prior Publication Data

US 2012/0124171 A1 May 17, 2012

(51) Int. Cl.
*G06F 15/177* (2006.01)

(52) U.S. Cl. .......... 709/219; 709/222; 709/94; 370/423; 705/51

(58) Field of Classification Search .................. 709/219, 709/222, 94; 705/51; 370/432
See application file for complete search history.

(56) References Cited

U.S. PATENT DOCUMENTS

| | | | |
|---|---|---|---|
| 4,558,413 A | 12/1985 | Schmidt et al. | |
| 6,381,742 B2 | 4/2002 | Forbes et al. | |
| 2003/0200290 A1* | 10/2003 | Zimmerman et al. | 709/222 |
| 2003/0236582 A1* | 12/2003 | Zamir et al. | 700/94 |
| 2005/0021470 A1* | 1/2005 | Martin et al. | 705/51 |
| 2005/0286546 A1* | 12/2005 | Bassoli et al. | 370/432 |
| 2008/0222235 A1 | 9/2008 | Hurst et al. | |
| 2009/0158382 A1 | 6/2009 | Shaffer et al. | |

OTHER PUBLICATIONS

AudioBox, http://audiobox.fm/blog/new-version-of-audioboxfm-android-native-app-java-libraries-iphone, AudioBlog, Jul. 10, 2010.
Bassoli, Arianna et al. Social research for WAND and new media adoption on a local scale, dyd02: 2nd International Conference on Open Collaborative Design for Sustainable Innovation, Bangalore, Dec. 1-2, 2002.
Bassoli, Arianna et al., tunA: a handheld ad-hoc radio device for local music sharing, Human Connectedness, Projects, tunA, http://web.archive.org/web/20100710032924/http://web.media.mit.edu/~stefan/hc/projects/tuna, accessed on Sep. 30, 2011.
Bassoli, Arianna et al., TunA: a mobile music experience to foster local interactions, Adjunct Proceedings, UbiComp 2003 Fifth International Conference on Ubiquitous Computing, Seattle, Oct. 12-15, 2003.
Bassoli, Arianna et al., tunA: Local Music Sharing with Handheld Wi-Fi Devices, Fifth Wireless World Conference, University of Surrey, UK, Jul. 15-16, 2004.
Bassoli, Arianna et al., tunA: Synchronised Music-Sharing on Handheld Devices, Human Connectedness Group, Media Lab Europe, Sugar House Lane, Bellevue, Dublin 8, Ireland, 2004.
Battle of the Streaming Music Services, Lifehacker Showdown, Sep. 30, 2011.

(Continued)

*Primary Examiner* — Tammy Nguyen
(74) *Attorney, Agent, or Firm* — Fish & Richardson P.C.

(57) ABSTRACT

A server system stores media library associated with a user. The media library includes at least one media file. The server system determines whether the media file is stored on a second computing device that is able to send the media file to the first computing device across a local network connecting the first computing device and the second computing device. If the determination indicates that the media file is stored on a second computing device that is able to send the stored media file to the first computing device across a local network connecting the first computing device and the second computing device, the server system sends causes the second computing device to send the media file to the first computing device across the local network such that the first computing device is able to output the media file to the user.

18 Claims, 5 Drawing Sheets

OTHER PUBLICATIONS

Baumann, Stephan et al., BluetunA: Let Your Neighbour Know What Music You Like, CHI 2007, Interactivity, Apr. 28-May 3, 2007, San Jose, CA, ACM 978-1-59593-642-4/07/0004.

Carphone Warehouse and Catch Media launch cloud music service, The Music Ally Weblog—Sandbox FM—Digital Music Marketing Blog—Aliado Digital, http://musically.com/blog/2010/08/02/carphone-warehouse-and-catch-media-launch-cloud-music-service/, Aug. 2, 2010.

Hachman, Mark, MSpot Launches Mobile Music Streaming for Android, posted on AppScout, Jun. 28, 2010.

Hakansson, Maria et al., Designing a Mobile Music Sharing System Based on Emergent Properties. In Proceedings of AMT 2005, Third International Conference on Active Media Technology, May 19-21, 2005, Takamatsu, Japan.

Hakansson, Maria et al., Facilitating Mobile Music Sharing and Social Interaction with Push!Music. HICSS '07 Proceedings of the 40th Annual Hawaii International Conference on System Sciences, 2007.

Jacobsson, Mattias et al. Push!Music: Intelligent Music Sharing on Mobile Devices. In Adjunct Proceedings of UbiComp 2005, Sep. 11-14, 2005, Tokyo, Japan. Demonstration.

Kincaid, Jason, First Look:Lala's iPhone App Will Stream Your Music Library From the Cloud, Mar. 28, 2009.

Learn more about Spotify Mobile, http://www.spotify.com/int/mobile/learn-more, Aug. 20, 2010, accessed from http://web.archive.org/web/20100820054452/http://www.spotify.com/int/mobile/learn-more/.

About MP3tunes, MP3tunes, http://www.mp3tunes.com/cb/about, Feb. 7, 2010, accessed from http://web.archive.org/web/20100207180835/http://www.mp3tunes.com/cb/about/.

O'Hara, Kenton et al., Consuming Music Together, Social and Collaborative Aspects of Music Consumption Technologies, Computer Science, Computer Supported Cooperative Work, vol. 35, http://www.springer.com/computer/book/978-1-4020-4031-3, accessed Oct. 12, 2011.

Parr, Ben, moof:A Free iTunes for the Web?, Jul. 19, 2009.

Push!Music[home].pdf, Push!Music About Page, http://www.sics.se/fal/projects/music/index.html, accessed on Sep. 30, 2011.

Push!Music [about project].pdf, Push!Music About Page, http://www.sics.se/fal/projects/music/project.html, accessed on Sep. 30, 2011.

Push!Music [texts&presentations].pdf, Push!Music Text and Presentations Page, http://www.sics.se/fal/projects/music/texts.html, accessed on Sep. 30, 2011.

Rhapsody + Electronics, http://www.rhapsody.com/iphone, Aug. 24, 2010, accessed from http://www.web.archive.org/web/20100824001310/http://www.rhapsody.com/iphone.

There's No App for That, httP://blog.posnar.com/2010/03/19/theres-no-app-for-that-2/, posted Mar. 19, 2010.

Vanhemert, Kyle, MOG Mobile for iPhone and Android Streams 8 Million Songs and Lets You Download 'Em All, , Jul. 20, 2010.

Non-Final Office Action issued in U.S. Appl. No. 13/250,388 on Feb. 16, 2012, 7 pages.

* cited by examiner

MEDIA FILE ACCESS

TECHNICAL FIELD

This document generally relates to media file access.

BACKGROUND

Consumers of media (e.g., music and video) increasingly access and play media stored on remote servers. For example, in some schemes, consumers may store their media files at a server for remote access from a variety of devices and/or users may join a subscription service to gain access a media library stored on a remote server. In some instances, users may stream or access media held on remote servers, such as through a web browser or a program communicating through an application programming interface.

SUMMARY

In one aspect, a computer-implemented method for sending media files to a computing device includes storing, at a server system, a media library associated with a user, the media library including at least one media file and receiving, at the server system, a request from a first computing device for the media file from the media library. The first computing device sent the request in response to the user selecting the media file for output by the first computing device. The method further includes determining, at the server system, whether the media file is stored on a second computing device that is able to send the media file to the first computing device across a local network connecting the first computing device and the second computing device. The method includes sending the media file to the first computing device from the server system such that the first computing device is able to output the media file to the user if the determination indicates that the media file is not stored on a second computing device that is able to send the stored media file to the first computing device across a local network connecting the first computing device and the second computing device. The method also includes sending, from the server system to the first computing device or the second computing device, an instruction that causes the second computing device to send the media file to the first computing device across the local network such that the first computing device is able to output the media file to the user if the determination indicates that the media file is stored on a second computing device that is able to send the stored media file to the first computing device across a local network connecting the first computing device and the second computing device.

Implementations may include one or more of the following features. For example, the method may include determining whether the user of the first computing device and a user of the second computing device have both opted into a service that provides for the sending of requested media items between devices on local networks when available rather than sending the requested media items from the server system.

The method may include determining that the second computing device has sent an initial portion of the media file to the first computing device across the local network but is unable to send a remaining portion of the media file to the first computing device across the local network and, in response to determining that the second computing device is unable to send the remaining portion of the media file to the first computing device across the local network, sending, from the server system, the remaining portion of the media file to the first computing device.

The second computing device may be unable to send the remaining portion of the media file to the first computing device across the local network because the second computing device is disconnected from the local network. The first computing device may have sent the request for the media item across a cellular network that is not a part of the local network. The local network may be a non-cellular, wireless local area network.

The local network may be an isolated local network. The first computing device may have sent the request to the server system across the local network and one or more intermediary networks connecting the local network to a network that includes the server system.

Determining, at the server system, whether the media file is stored on a second computing device that is able to send the media file to the first computing device across a local network connecting the first computing device and the second computing device may include determining that the first computing device and the second computing device are connected to the local network. Determining, at the server system, whether the media file is stored on a second computing device that is able to send the media file to the first computing device across a local network connecting the first computing device and the second computing device may include determining that the first computing device and the second computing device are located within a defined geographic proximity such that a wireless local area network is able to be established between the first computing device and the second computing device.

In another aspect, a system includes a first computing device, a second computing device, a local network, and a server system. The first computing device is configured to send a request to a server system for a media file. The second computing device stores the media file. The local network connects the first computing device and the second computing device. The server system is configured to receive the request from the first computing device; determine that the media file is stored on the second computing device; determine that the second computing device is able to send the media file to the first computing device across the local network; and in response to determining that the media file is stored on the second computing device and that the second computing device is able to send the media file to the first computing device across the local network, send, to the first computing device or the second computing device, an instruction that causes the second computing device to send the media file to the first computing device across the local network such that the first computing device is able to output the media file to the user.

Implementations may include one or more of the following features. For example, the media file may be stored at the server system as part of a media library associated with a user of the first computing device. The first computing device may send the request in response to the user selecting the media file for output by the first computing device.

The server system may be further configured to determine whether the user of the first computing device and a user of the second computing device have both opted into a service that provides for the sending of requested media items between devices on local networks when available rather than sending the requested media items from the server system.

The server system may be further configured to determine that the second computing device has sent an initial portion of the media file to the first computing device across the local network but is unable to send a remaining portion of the media file to the first computing device across the local network; and, in response to determining that the second computing device is unable to send the remaining portion of the media file to the first computing device across the local network, send the remaining portion of the media file to the first computing device.

The second computing device may be unable to send the remaining portion of the media file to the first computing device across the local network because the second computing device is disconnected from the local network. The first computing device may have sent the request for the media item across a cellular network that is not a part of the local network.

In another aspect, a computer readable medium storing instruction that, when executed by one or more processing devices, cause the one or more processing devices to store, at a server system, a media library associated with a user, the media library including at least one media file; receive, at the server system, a request from a first computing device for the media file from the media library, wherein the first computing device sent the request in response to the user selecting the media file for output by the first computing device; determine, at the server system, whether the media file is stored on a second computing device that is able to send the media file to the first computing device across a local network connecting the first computing device and the second computing device; if the determination indicates that the media file is not stored on a second computing device that is able to send the stored media file to the first computing device across a local network connecting the first computing device and the second computing device, send the media file to the first computing device from the server system such that the first computing device is able to output the media file to the user; and if the determination indicates that the media file is stored on a second computing device that is able to send the stored media file to the first computing device across a local network connecting the first computing device and the second computing device, send, from the server system to the first computing device or the second computing device, an instruction that causes the second computing device to send the media file to the first computing device across the local network such that the first computing device is able to output the media file to the user.

In another aspect, a computer-implemented method for providing media files to a computing device includes sending from a first computing device to a server system storing a media library associated with a user, a request for a media file in the media library such that, upon receiving the request, the server system determines whether the media file is stored on a second computing device that is able to send the media file to the first computing device across a local network connecting the first computing device and the second computing device; if the determination indicates that the media file is not stored on a second computing device that is able to send the stored media file to the first computing device across a local network connecting the first computing device and the second computing device, send the media file to the first computing device such that the first computing device is able to output the media file to the user; and if the determination indicates that the media file is stored on a second computing device that is able to send the stored media file to the first computing device across a local network connecting the first computing device and the second computing device, send, to the first computing device or the second computing device, an instruction that causes the second computing device to send the media file to the first computing device across the local network such that the first computing device is able to output the media file to the user.

In another aspect, a computer readable medium storing instruction that, when executed by one or more processing devices, cause the one or more processing devices to send from a first computing device to a server system storing a media library associated with a user, a request for a media file in the media library such that, upon receiving the request, the server system determines whether the media file is stored on a second computing device that is able to send the media file to the first computing device across a local network connecting the first computing device and the second computing device; if the determination indicates that the media file is not stored on a second computing device that is able to send the stored media file to the first computing device across a local network connecting the first computing device and the second computing device, send the media file to the first computing device such that the first computing device is able to output the media file to the user; and if the determination indicates that the media file is stored on a second computing device that is able to send the stored media file to the first computing device across a local network connecting the first computing device and the second computing device, send, to the first computing device or the second computing device, an instruction that causes the second computing device to send the media file to the first computing device across the local network such that the first computing device is able to output the media file to the user.

Various implementations of the subject matter described here may provide one or more of the following advantages. In one or more implementations, sending media files to a first device from a second device over a local network may result in media file transfers that do not utilize access to the Internet or Internet Service Provider networks. In one or more implementations, sending media files to a first device from a second device over a local network may result in media file transfers at higher speed, of shorter time, and/or of higher quality than transfers sent from the media server. In some implementations, if a media file is available for streaming from a computing device on a local network, it may be less costly to stream the media file from the local network than from the cellular network if the user pays for the data provided by the cellular network on a usage basis. Additionally, cellular network bandwidth may be conserved. In one or more implementations, sending media files to a first device from a second device over a local network can result in media file transfers when a fault with a media server or peer device prevents the media server or peer device from sending the media file.

The details of one or more implementations are set forth in the accompanying drawings and the description below. Other features, objects, and advantages will be apparent from the description and drawings, and from the claims.

DETAILED DESCRIPTION

In some implementations, a media storage service may be provided in which users upload their media collections or media library to a media server system that is accessible over one or more connected networks, such as the Internet. A user may download or stream media files from his media library on the media server system to a user device in the possession of the user, such as a mobile device, and some or all of the media library may be stored on the user device. User's of the media storage service can opt into or subscribe to a peer-to-peer music sharing service. As a subscriber, a user agrees to allow songs stored locally on his computing device to be streamed to other computing devices and for songs stored on other computing devices to be streamed to his computing device. This occurs when the computing devices are each connected to a local network (e.g., a WiFi or Bluetooth network).

Thus, in some implementations, a user device can request a media file from a remote media server by sending the request across a cellular or other network connection to the media server. The media server can identify that the requesting device (e.g., a first computing device) and a source device (e.g., a second computing device) are able to communicate over a local network and are both associated with users that have opted into the media sharing service. The media server can send instructions to the requesting device or the source device that cause the source device to serve the media to the requesting device over the local network. In some implementations, the media may be transmitted in encrypted form over the local network between the two devices.

As an example, two users in a coffee shop (Bob and Sally) are connected to a free available WiFi local network. Bob wants to listen to a song he owns or has rights to that is not stored locally on his cell phone. The selected song is stored and available for streaming on Sally's laptop. Both Bob and Sally are connected to the local network and both are subscribers to the peer-to-peer media sharing service. The server receives the request from Bob's cell phone for the song, identifies that Bob and Sally are on the same local network (e.g., uses network address or GPS coordinates), determines that they are both subscribers to the music sharing service and instructs Sally's device to begin streaming the requested song to Bob's device.

If Sally leaves the coffee shop before the song has finished playing, the server can find another source of the song for Bob (e.g., use the server copy of the song or identify another subscriber user on the local network) to provide seamless streaming of the song to Bob's cell phone.

Figure 1:
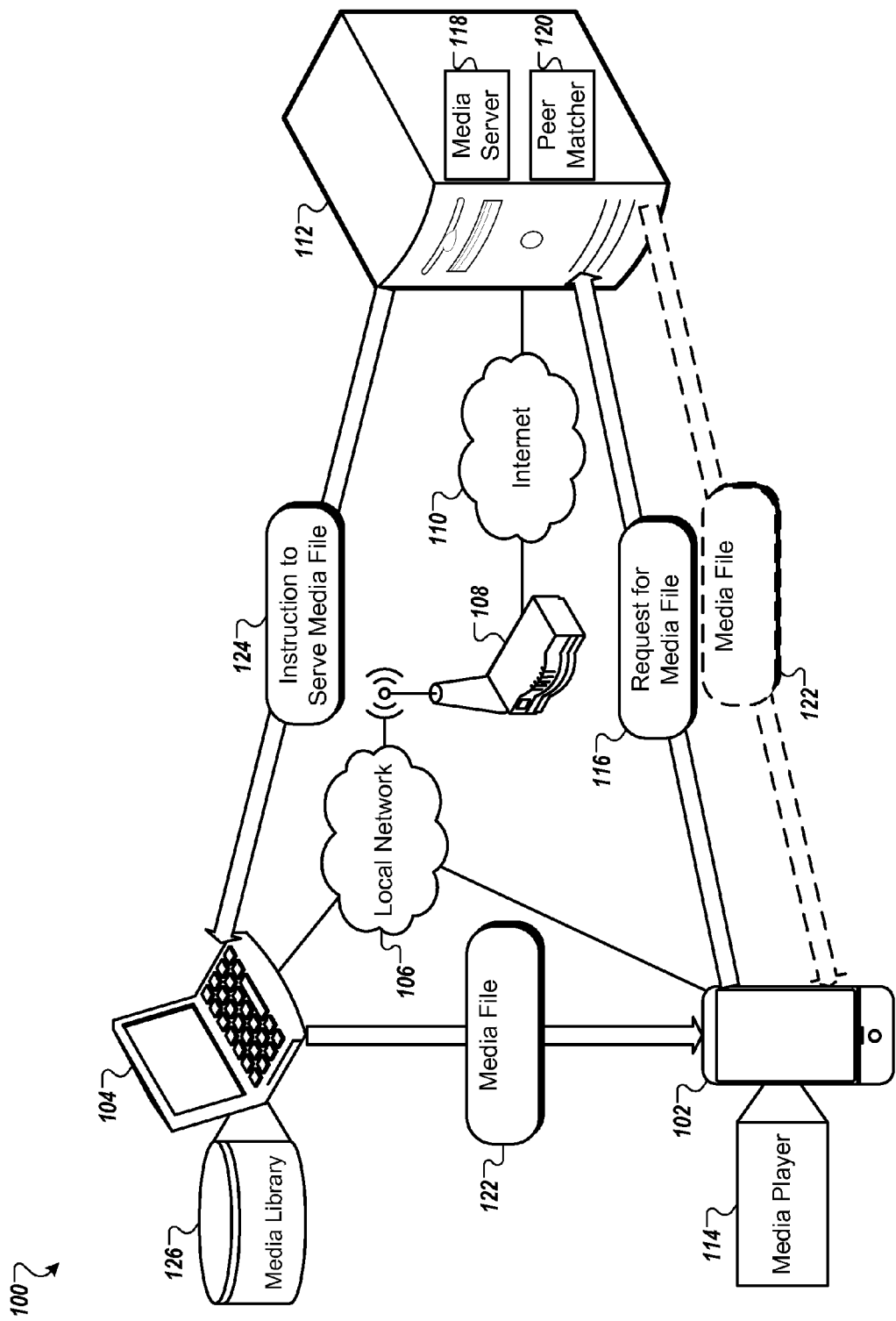
FIG. 1 is a block diagram illustrating an example of a system in which a media file may be served from a peer on a common internet-connected network.

FIG. 1 is a block diagram illustrating an example of a system 100 in which a media file may be served from a peer on a common internet-connected network. The system includes a first user computing device 102 and a second user computing device 104 that are connected to a local network 106 (e.g., a network where the data is routed entirely on a private backbone or, in some cases, where data is routed over a public backbone using encrypted protocols like virtual private networks (VPN)). The user devices 102 and 104 may be any appropriate computing device that can receive user input; store or output media files; and communicate through a network. Example devices include, but are not limited to, desktop computers, laptop computers, and cellular telephones. The user devices 102 and 104 can be connected to the local network 106 though, for example, a wireless connection such as IEEE 802.11x (which may be referred to as WiFi) or Bluetooth, or a wired connection, such as Ethernet, or universal serial bus (USB). A router 108 can connect the local network 106, and by extension user devices 102 and 104, to the Internet 110, and by extension to Internet connected devices such as a media server system 112 that includes one or more media servers 118 and one or more peer matchers 120.

The user device 102 can include a media player 114 to request and play media files. The media player 114 can generate a request for a media file 116, for example in response to user input requesting that a particular media file or type of media file be output (that is, played) by the device 102. The request for media file 116 can be sent by the user device 102, through the local network 106, router 108, and Internet 110, to the media server 118. In response to receiving the request for media file 116, the media server 118 employs the peer matcher 120 to search for a peer to the user device 102 that can send the requested media file to the device 102 across a local network. The peer matcher 120 can identify suitable peers based on one or more factors including, but not limited to, geographic location, network compatibility, and storage of a requested media file. In this example, the peer matcher 120 may identify the user device 104 as one such peer.

Once the peer matcher 120 has identified a user device 104 as a suitable peer device, the media server 118 sends instructions to the user device 104, through the Internet 110, the router 108, and the local network 106, that cause the user device 104 to contact user device 102 across the local network 106 and transmit the requested media file to user device 102 over the local network 106. Alternatively, the media server 118 can send instructions to the user device 102 (these instructions not shown) that cause the user device 102 to contact the user device 104 and retrieve the requested media file from user device 104 across the local network. In some implementations, when no peer is identified, the media server 118 sends the media file 122 to the media player 114.

The user device 104 can retrieve the media file from a media library 126 and send the media file to the user device 102 through the local network 106. The media player 114 can begin playing the media file. In some implementations, the media file 122 can be sent in blocks or an ordered stream, and the media player 114 can begin playing the media file 122 as the user device 102 receives the media file 122. The media server 118 can monitor the transfer of the media file 122 from the user device 104 to the user device 102. If a termination of the transfer is observed or expected (for example, because user device 104 disconnects from local network 106), the media server can send the full or remaining untransferred portions of the media file 122 to the user device 102, or locate another device on local network 106 that is storing the media file and cause the other device to send the remaining portion to the user device 102. In some implementations, such as when the media player 114 is streaming media for immediate consumption, the media player 114 can play and then discard the media file 122.

In some implementations, only devices that are associated with users that have opted into the media sharing service may be eligible for sharing media across a local network. In this case, for example, the media server 118 may first determine whether the users of user device 102 and user device 104 have opted into the service before sending the instructions that cause the requested media file to be sent from user device 104 to user device 102. The media server may make this determination by, in response to receiving the request from the media file from user device 102, that the user associated with the user device 102 has opted into the service, and then cause the peer matcher 120 to limit the search for peer devices to those that have opted into the service. Alternatively, the media server 118 may cause the peer matcher 120 to determine the possible peers, and then eliminate those that are not associated with users that have opted into the media sharing service.

The following describes an example of an implementation of system 100 in use. A first user in a coffee shop is using a mobile phone 102 to run a music application that plays music from the user's library stored on a centralized server 112. The mobile phone 102 is connected to an internet connected Wi-Fi network 106 provided by the coffee shop. The user has opted into a media sharing service through the music application to permit streaming of music from local networked sources, where available.

The user creates a playlist of songs in the user's library by selecting a genre of music in the music applications interface, "American Folk" for example. The music application generates a request for a playlist of music 116 which is associated with the "American Folk" genre, and sends the request to a centralized server 112 that manages the user's library. The centralized server 112 generates a stream of songs 122 from the user's library that are associated with the "American Folk" genre and sends the stream to the user's mobile phone. The centralized server 112 also inspects a database table of known devices that are associated with users that have opted into the same media sharing service; that are known to have stored a particular music file that is also in the user's library and associated with the "American Folk" genre; and that are on the same local network as the user's mobile phone. Devices on the same local network can be identified, for example, based on both devices' internal and external IP address In this example one such device is found, a laptop 104 used by another user in the coffee shop. Instructions 124 are sent to the laptop 104 with information about the media stream (IP address, media file identifiers, etc.). Personal information about the user of the mobile phone (user name, device type, etc.) need not be included, for example to protect the privacy of both users. Additionally, no notifications need be shown to the user of either device. Alternatively, one or both devices can display a message with anonymous data. For example, a system alert on the laptop can have the text "Providing a media stream to 1 user" and an option to cancel the stream. In another example, a message in the music application of the mobile phone can show that music is being sent from an unnamed local network source and that audio quality will be improved compared to a stream from the centralized server 112 that must pass through the Internet.

The laptop 104 can create a list of music files identified in the instructions 124 and available in a local music library 126; and can provide a stream of the files 122 to the mobile phone in place of the stream 122 provided by the centralized server. The centralized server 112 may leave the communication channel with the mobile phone 102 active to monitor for the status of the stream from the laptop.

When the stream from the laptop 104 is terminated, for example when one device disconnects from the Wi-Fi network 106 or when the laptop has 104 exhausted its media files, the centralized server 112 can resume providing the media stream 122.

The following describes another example of an implementation of system 100 in use. A user is using a tablet computing device 102 to access home movies that have been stored on a remote, internet connected media server 112. The original copies of the home movies are also stored on the user's network attached storage ("NAS") device 104. The tablet 102 is connected to the user's home network 106 by an 802.11 data connection, and the NAS 104 is connected to the user's home network 106 by an Ethernet connection.

The user of the tablet device 102 uses a web browser 114 to access the user's personal library listing on the media server 112 and selects a video to watch. The media server 112 determines that the tablet 102 is on the same network as the NAS 104, which contains the original copy of the home movie that the user requested. As such, the media server 112 generates a web page with an embedded object to play the movie. The embedded object contains code with instructions 124 to attempt to retrieve the media file 122 from the NAS 104 if possible, or from the media server 112 if the NAS 104 is unavailable or unable to provide the media file 122.

In some implementations of this example, serving the home movie from the NAS 104 may provide the tablet 102 with a higher quality version of the media file, for example if the media file is compressed by the media server 112. Additionally, this may reduce the usage of the user's internet connection, which may have bandwidth caps, network latency, or usage charges.

Figure 2:
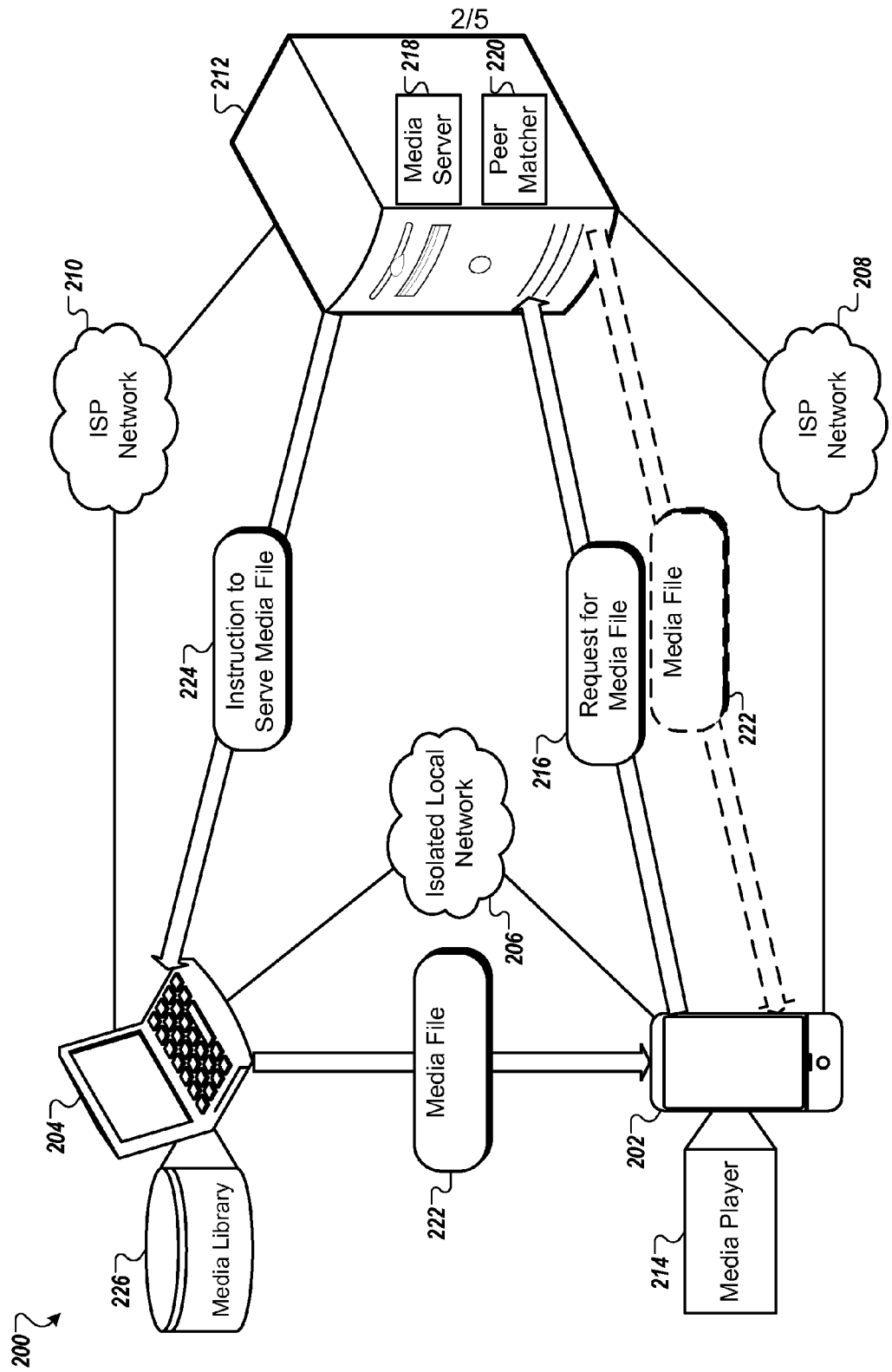
FIG. 2 is a block diagram illustrating an example of a system in which a media file may be served from a peer on an isolated network.

FIG. 2 is a block diagram illustrating an example of a system 200 in which a media file may be served from a peer on an isolated network. The system includes a first user computing device 202 and a second user computing device 204. The user devices 202 and 204 may be any appropriate computing device that can receive user input; store or output media files; and communicate through a network. Example devices include, but are not limited to, desktop computers, laptop computers, and cellular telephones. The user devices 202 and 204 can set up and communicate though, for example, a wireless connection such as IEEE 802.11x (which may be referred to as WiFi) or Bluetooth, or a wired connection, such as Ethernet, or universal serial bus (USB). The user devices 202 and 204 can be connected to internet service provider (ISP) networks 208 and 210, respectively, and by extension internet connected devices such as a media server system 212 that includes one or more media servers 118 and one or more peer matchers 120. In some examples, the ISP network 208 and 210 may be the same ISP network, and one or both networks may be a cellular data network.

The user device 202 can include a media player 214 to request and play media files. The media player 214 can generate a request for a media file 216, for example in response to user input requesting that a particular media file or type of media file be output (that is, played) by the device 102. The request for media file 216 can be sent by the user device 202, through the ISP network 208, to the media server 218. In response to receiving the request for media file 216, the media server 218 employs the peer matcher 220 to search for a peer to the user device 202 that can send the requested media file to the device 202 across a local isolated network. In this example, the peer matcher 220 may identify the user device 204 as one such peer. For example, the user devices 202 and 204 may be geographically close to each other and able to set up and communicate on local network 206.

An isolated network, for example, may be a network on which two or more user devices can communicate but which is not connected to the Internet or other networks. Some configurations of a Bluetooth or ad-hoc Wi-Fi network may be considered isolated networks. The local network 206 may exist at the time the request for media file 216 is sent, or it may be set up in response to determining that a peer is close to the user device 202.

Once the peer matcher 220 has identified a user device 204 as a suitable peer device, the media server 218 sends instructions to the user device 204, through the ISP network 210, that cause the user device 204 to contact user device 202 across the local network 206. If the local network 206 is not set up when the instructions to serve the media file 224 are created, instructions for the creation of the local network 206 can be included. Alternatively, the media server 218 can send instructions to the user device 202 (these instructions not shown) that cause the user device 202 to contact the user device 204 and retrieve the requested media file from the user device 204 across the local network 206. In some implementations, when no peer is identified, the media server 218 sends the media file 222 to the media player 214.

The user device 204 can retrieve the media file from a media library 226 and send the media file to the user device 202 through the local network 206. The media player 214 can begin playing the media file. In some implementations, the media file 222 can be sent in blocks or an ordered stream, and the media player 214 can play a portion of the media file 222 as the user device 202 receives the media file 222. The media server 218 can monitor the transfer of the media file 222 from the user device 204 to the user device 202. If a termination of the transfer is observed or expected (for example, because user device 204 disconnects from isolated network 106), the media server can send the full or remaining untransferred portions of the media file 222 to the user device 202, or locate another device on local network 206 that is storing the media file and cause the other device to send the remaining portion to the user device 102.

In some implementations, only devices that are associated with users that have opted into the media sharing service may be eligible for sharing media across a local network. In this case, for example, the media server 218 may first determine whether the users of user device 202 and user device 204 have opted into the service before sending the instructions that cause the requested media file to be sent from user device 204 to user device 202. The media server may make this determination by, in response to receiving the request for the media file from user device 202, that the user associated with the user device 202 has opted into the service, and then cause the peer matcher 220 to limit the search for peer devices to those that have opted into the service. Alternatively, the media server 218 may cause the peer matcher 220 to determine the possible peers, and then eliminate those that are not associated with users that have opted into the media sharing service.

The following describes an example of an implementation of the system 200 in use. A first user of a user device 202, here, a mobile telephone connected to a cellular data network 208, is purchasing an audio file of a song for download and playback on the user's mobile telephone. The user is at a populated bus stop, surrounded by other users of other computing devices that are connected to the same or other data networks.

The user loads a shopping application, browses a catalog of recording artists, and selects a song to purchases. The financial aspects of the purchase request are sent to a financial transaction server (not shown here), and the file specifications are sent to a media server 218 over the cellular network.

A peer matcher 220 searches for computing devices that are near the user's mobile telephone, that have the purchases song stored, and that have communication capabilities that are compatible with the user's mobile telephone. Communication capabilities can include a list of network protocols across which a device can communicate and the distance for which those protocols apply. The peer matcher can identify a second mobile phone 204 that can communicate through a Bluetooth network and that is a meter away from the user's mobile telephone, which can also communicate through a Bluetooth network.

The media server 218 can send instructions 224 over the cellular network to the second mobile phone 204 to create a Bluetooth network 206 between the two devices 202 and 204, and to transfer the media file 222 to the user's mobile phone. The user's mobile phone can receive the media file 222 from the other mobile device 204 across the Bluetooth network 206, and alert the media server 218 over the cellular network when the media file 222 is successfully received. The media file 222 can be verified before or during this alert, for example with a hash value generated from the media file 222. If the media file 222 fails verification one or more times, the media server 218 can send instructions to one or both mobile telephones to sever the Bluetooth connection and the media server 218 can send the song file to the user's mobile telephone through the cellular data network. Similarly, the media server 218 can send the song to the device 202 through the cellular network if the other device 204 disconnects from the Bluetooth network 206.

The following describes an example of another implementation of system 200 in use. A first user of a user device 202, here, a laptop computer, is connected to the ISP network 208, here a cellular data network, and is listening to music in the user's library, which has been stored on a media server system 212. The user is at a park and other computing devices are nearby.

The user selects a song title to play in a media library application, e.g., media player 214. The laptop computer generates a request for the media file 216 that includes a unique identifier for the song. The request for the media file 216 is sent to the media server system 212 over the cellular data network. The peer matcher 220 identifies the laptop computer and sets communication parameters for a peer search. The peer matcher 220 has previously determined that the laptop computer can communicate through Bluetooth at a first distance and ad-hoc Wi-Fi at a second distance. The location of the laptop computer is determined, by either the laptop computer or the peer matcher 220, based on cell triangulation information provided by the cellular network 208. Alternatively, or additionally, a Global Positioning System unit may be included in the laptop to provide geographic location information for the laptop.

The peer matcher 220 searches for peer devices that can communicate through Bluetooth within the first distance of the laptop device or that can communicate through ad-hoc Wi-Fi within the second distance. A second user device 204, here a mobile phone, is located within the first distance, and the peer matcher 220 verifies that the mobile phone can communicate through Bluetooth and stores the requested media file.

Instructions to serve the media file 224 are generated with information about the requested media file and the laptop and sent to the mobile phone from the media server system 212 over the cellular network. In response, the mobile phone sets up an isolated network 206, e.g., a Bluetooth network, and offers a music file (media file 222) to the laptop computer. Upon completion of the transfer, the laptop computer sends a message to the media server system 212 over the cellular network with an alert about the completed transfer.

Figure 3:
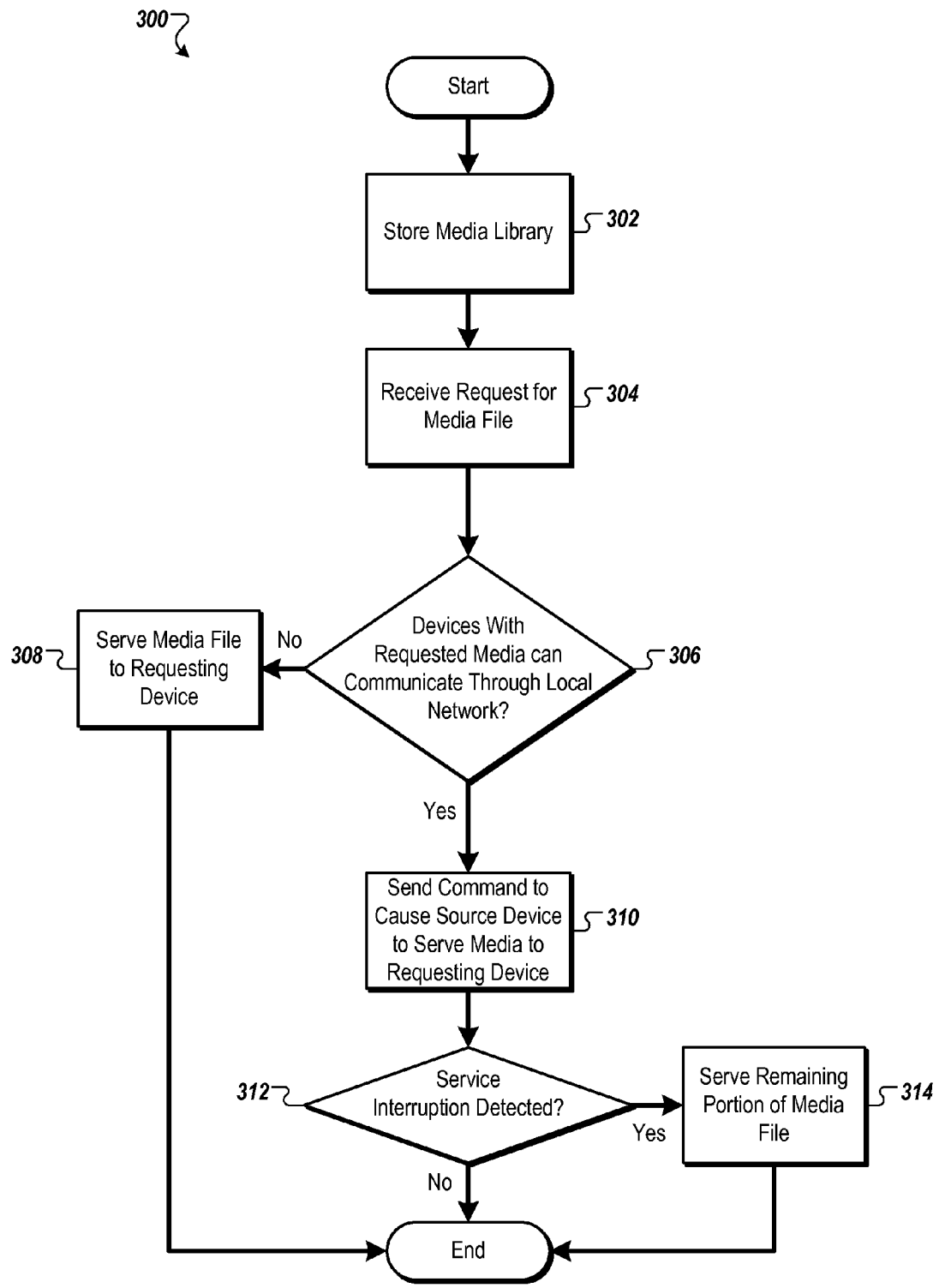
FIG. 3 is a flowchart showing an example of a process for responding to a request for a media file.

FIG. 3 is a flowchart showing an example of a process 300 for responding to a request for a media file. The process 300 can be performed by, for example, systems such as the media server 118 and the peer matcher 120 and for clarity of presentation, the description that follows uses the system 100 as the basis of an example describing the process. However, another system, or combination of systems, may be used to perform the process 300.

A media library that includes at least one media file and that is associated with a user is stored at a server system (302). For example, a collection of media files can be stored to computer readable medium by the media server 118. The media server 118 can create an index of the media library files, referencing the media files by metadata such as artist, title, genre, rating, etc.

A request is received at the server system from a requesting device for a media file, the requesting device sending the request in response to the user selecting the media file for output by the requesting computer device (304). For example, the user device 102 can request a particular media file or provide criteria for a class of media files to be output to the user of the user device 102 and, in response, the user device 102 can send a request for the media file to the media server 118. Alternatively, or additionally, the request can be part of a financial transaction, such as a purchase or rental, or a non-financial request, such as for ad supported or free media. The request can be transmitted from the user device 102 to the media server 118 through an internet connected local network or, for example, through a cellular network connection.

The server system determines whether the media file is stored on another device that is able to send the media file to the requesting device across a local network (306). For instance, the peer matcher 120 can perform a search for devices that can communicate through a local network with the requesting device. In some instances, this includes searching for devices that are already connected to the local network with the requesting device. Alternatively, or additionally, this may include searching for devices that are not currently connected with the requesting device, but that could communicate if a local network was created. For example, the peer matcher 120 can determine that the user device 104 may be able to communicate with the user device 102 on an internet connected network, on an isolated network, or on a network created by the user device 102 or 104. In some examples, the peer matcher 120 can use the geographic locations of devices to determine if devices can communicate through a local network. In some examples, the peer matcher 120 can use the internal and external network addresses of user devices to determine if the user devices can communicate through a local network.

If one or more devices are found that can communicate through a local network with the requesting device, those source devices are examined to determine if the source devices have the requested media file. For example, the user device 104 can be identified as a source device, and the media library 126 can be searched.

If no device is found that is able to send the media file to the requesting device across a local network, the media file is served by the server system to the requesting device so that the requesting device can output the media file to a user (308). For example, the media server 118 can identify the media file in the media library and serve the file to the user device 102 through the internet connection.

If a source device is found that is able to send the media file to the requesting device across a local network, one or more commands are sent by the server to cause the source device to serve the media file to the requesting device so that the requesting device can output the media file to a user (310). Some or all of these commands can be sent to the source device, the requesting device, or both. For example, instructions can be sent to one or both user devices 102 and 104 to initiate a network connection with the other device if one such network does not exist. Instructions can be sent to one or both user devices 102 and 104 to initiate a transfer of the media file from the user device 104 to the user device 102.

The file transfer between the source device and the requesting device is monitored to determine whether a service interruption occurs (312). That the source computing device sends at least an initial portion of the media file to the requesting computer device across the local network, but in some instances is unable to send the remaining portion of the media file across the local network. For example, the media server 118 can remain in communication with one or both user devices 102 and 104 to monitor the status of the file transfer. Alternatively, or in addition one or both user devices 102 and 104 can report a successful or failed file transfer.

In response to determining that the source device is unable to send the remaining portion of the media file, the remaining portion of the file is served by the server to the requesting device (314). For example, if the first half of the media file is received by the user device 102 when the user device 104 is turned off or disconnected from the local network, the media server 118 can serve the second half of the media file to the user device 102. In some examples, the media file is buffered and output to the user while it is being transferred. The file transfers from the user device 104 and then from the media server 118 can both be placed in the buffer, and the media can be output to the user without interruption. In some implementations, instead of serving the remaining portion of the file, the server can identify a second source device and send a command to the second source device (or requesting device) to cause the second source device to serve the media file to the requesting device.

Figure 4:
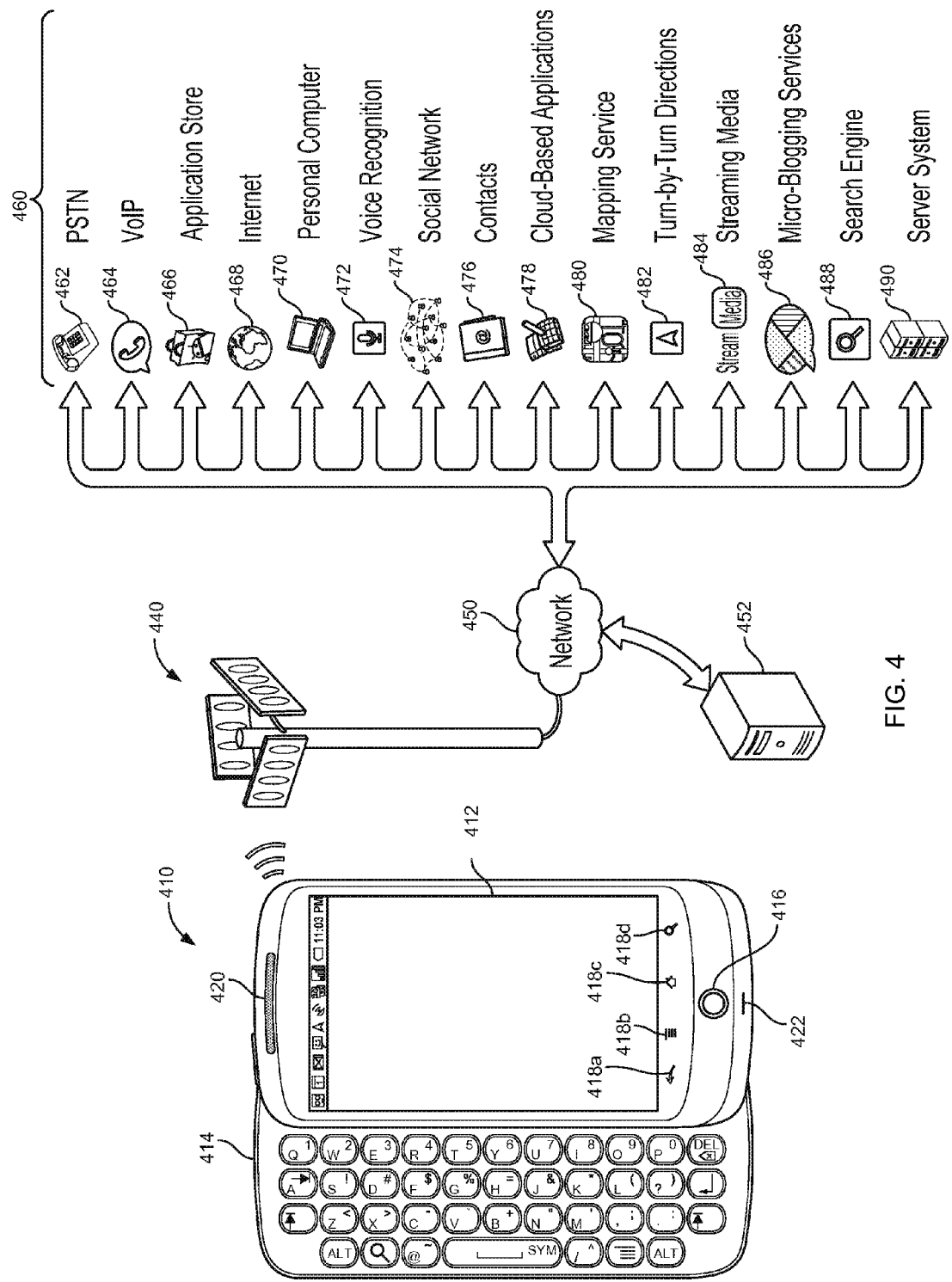
FIG. 4 is a diagram of a system that may be used to implement the systems and methods described in this document.

Referring now to FIG. 4, a conceptual diagram of a system that may be used to implement the systems and methods described in this document is illustrated. Mobile computing device 410 can wirelessly communicate with base station 440, which can provide the mobile computing device wireless access to numerous services 460 through a network 450.

In this illustration, the mobile computing device 410 is depicted as a handheld mobile telephone (e.g., a smartphone or an application telephone) that includes a touchscreen display device 412 for presenting content to a user of the mobile computing device 410. The mobile computing device 410 includes various input devices (e.g., keyboard 414 and touchscreen display device 412) for receiving user-input that influences the operation of the mobile computing device 410. In further implementations, the mobile computing device 410 may be a laptop computer, a tablet computer, a personal digital assistant, an embedded system (e.g., a car navigation system), a desktop computer, or a computerized workstation.

The mobile computing device 410 may include various visual, auditory, and tactile user-output mechanisms. An example visual output mechanism is display device 412, which can visually display video, graphics, images, and text that combine to provide a visible user interface. For example, the display device 412 may be a 3.7 inch AMOLED screen. Other visual output mechanisms may include LED status lights (e.g., a light that blinks when a voicemail has been received).

An example tactile output mechanism is a small electric motor that is connected to an unbalanced weight to provide a vibrating alert (e.g., to vibrate in order to alert a user of an incoming telephone call or confirm user contact with the touchscreen 412). Further, the mobile computing device 410 may include one or more speakers 420 that convert an electrical signal into sound, for example, music, an audible alert, or voice of an individual in a telephone call.

An example mechanism for receiving user-input includes keyboard 414, which may be a full qwerty keyboard or a traditional keypad that includes keys for the digits '0-9', '*', and '#.' The keyboard 414 receives input when a user physically contacts or depresses a keyboard key. User manipulation of a trackball 416 or interaction with a trackpad enables the user to supply directional and rate of rotation information to the mobile computing device 410 (e.g., to manipulate a position of a cursor on the display device 412).

The mobile computing device 410 may be able to determine a position of physical contact with the touchscreen display device 412 (e.g., a position of contact by a finger or a stylus). Using the touchscreen 412, various "virtual" input mechanisms may be produced, where a user interacts with a graphical user interface element depicted on the touchscreen 412 by contacting the graphical user interface element. An example of a "virtual" input mechanism is a "software keyboard," where a keyboard is displayed on the touchscreen and a user selects keys by pressing a region of the touchscreen 412 that corresponds to each key.

The mobile computing device 410 may include mechanical or touch sensitive buttons 418a-d. Additionally, the mobile computing device may include buttons for adjusting volume output by the one or more speakers 420, and a button for turning the mobile computing device on or off. A microphone 422 allows the mobile computing device 410 to convert audible sounds into an electrical signal that may be digitally encoded and stored in computer-readable memory, or transmitted to another computing device. The mobile computing device 410 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include the ANDROID mobile device platform; APPLE IPHONE/MAC OS X operating systems; MICROSOFT WINDOWS 7/WINDOWS MOBILE operating systems; SYMBIAN operating system; RIM BLACKBERRY operating system; PALM WEB operating system; a variety of UNIX-flavored operating systems; or a proprietary operating system for computerized devices. The operating system may provide a platform for the execution of application programs that facilitate interaction between the computing device and a user.

The mobile computing device 410 may present a graphical user interface with the touchscreen 412. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 404. User-selection of the button may invoke the pre-defined action.

In some examples, the operating system provides a "desktop" user interface that is displayed upon turning on the mobile computing device 410, activating the mobile computing device 410 from a sleep state, upon "unlocking" the mobile computing device 410, or upon receiving user-selection of the "home" button 418c. The desktop graphical interface may display several icons that, when selected with user-input, invoke corresponding application programs. An invoked application program may present a graphical interface that replaces the desktop graphical interface until the application program terminates or is hidden from view.

User-input may manipulate a sequence of mobile computing device 410 operations. For example, a single-action user input (e.g., a single tap of the touchscreen, swipe across the touchscreen, contact with a button, or combination of these at a same time) may invoke an operation that changes a display of the user interface. Without the user-input, the user interface may not have changed at a particular time. For example, a multi-touch user input with the touchscreen 412 may invoke a mapping application to "zoom-in" on a location, even though the mapping application may have by default zoomed-in after several seconds.

The desktop graphical interface can also display "widgets." A widget is one or more graphical interface elements that are associated with an application program that has been executed, and that display on the desktop content controlled by the executing application program. A widget's application program may start with the mobile telephone. Further, a widget may not take focus of the full display. Instead, a widget may only "own" a small portion of the desktop, displaying content and receiving touchscreen user-input within the portion of the desktop.

The mobile computing device 410 may include one or more location-identification mechanisms. A location-identification mechanism may include a collection of hardware and software that provides the operating system and application programs an estimate of the mobile telephone's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by "checking in" to a location).

The mobile computing device 410 may include other application modules and hardware. A call handling unit may receive an indication of an incoming telephone call and provide a user capabilities to answer the incoming telephone call. A media player may allow a user to listen to music or play movies that are stored in local memory of the mobile computing device 410. The mobile telephone 410 may include a digital camera sensor, and corresponding image and video capture and editing software. An internet browser may enable the user to view content from a web page by typing in an addresses corresponding to the web page or selecting a link to the web page.

The mobile computing device 410 may include an antenna to wirelessly communicate information with the base station 440. The base station 440 may be one of many base stations in a collection of base stations (e.g., a mobile telephone cellular network) that enables the mobile computing device 410 to maintain communication with a network 450 as the mobile computing device is geographically moved. The computing device 410 may alternatively or additionally communicate with the network 450 through a Wi-Fi router or a wired connection (e.g., Ethernet, USB, or FIREWIRE). The computing device 410 may also wirelessly communicate with other computing devices using BLUETOOTH protocols, or may employ an ad-hoc wireless network.

A service provider that operates the network of base stations may connect the mobile computing device 410 to the network 450 to enable communication between the mobile computing device 410 and other computerized devices that provide services 460. Although the services 460 may be provided over different networks (e.g., the service provider's internal network, the Public Switched Telephone Network, and the Internet), network 450 is illustrated as a single network. The service provider may operate a server system 452 that routes information packets and voice data between the mobile computing device 410 and computing devices associated with the services 460.

The network 450 may connect the mobile computing device 410 to the Public Switched Telephone Network (PSTN) 462 in order to establish voice or fax communication between the mobile computing device 410 and another computing device. For example, the service provider server system 452 may receive an indication from the PSTN 462 of an incoming call for the mobile computing device 410. Conversely, the mobile computing device 410 may send a communication to the service provider server system 452 initiating a telephone call with a telephone number that is associated with a device accessible through the PSTN 462.

The network 450 may connect the mobile computing device 410 with a Voice over Internet Protocol (VoIP) service 464 that routes voice communications over an IP network, as opposed to the PSTN. For example, a user of the mobile computing device 410 may invoke a VoIP application and initiate a call using the program. The service provider server system 452 may forward voice data from the call to a VoIP service, which may route the call over the internet to a corresponding computing device, potentially using the PSTN for a final leg of the connection.

An application store 466 may provide a user of the mobile computing device 410 the ability to browse a list of remotely stored application programs that the user may download over the network 450 and install on the mobile computing device 410. The application store 466 may serve as a repository of applications developed by third-party application developers. An application program that is installed on the mobile computing device 410 may be able to communicate over the network 450 with server systems that are designated for the application program. For example, a VoIP application program may be downloaded from the Application Store 466, enabling the user to communicate with the VoIP service 464.

The mobile computing device 410 may access content on the internet 468 through network 450. For example, a user of the mobile computing device 410 may invoke a web browser application that requests data from remote computing devices that are accessible at designated universal resource locations. In various examples, some of the services 460 are accessible over the internet.

The mobile computing device may communicate with a personal computer 470. For example, the personal computer 470 may be the home computer for a user of the mobile computing device 410. Thus, the user may be able to stream media from his personal computer 470. The user may also view the file structure of his personal computer 470, and transmit selected documents between the computerized devices.

A voice recognition service 472 may receive voice communication data recorded with the mobile computing device's microphone 422, and translate the voice communication into corresponding textual data. In some examples, the translated text is provided to a search engine as a web query, and responsive search engine search results are transmitted to the mobile computing device 410.

The mobile computing device 410 may communicate with a social network 474. The social network may include numerous members, some of which have agreed to be related as acquaintances. Application programs on the mobile computing device 410 may access the social network 474 to retrieve information based on the acquaintances of the user of the mobile computing device. For example, an "address book" application program may retrieve telephone numbers for the user's acquaintances. In various examples, content may be delivered to the mobile computing device 410 based on social network distances from the user to other members. For example, advertisement and news article content may be selected for the user based on a level of interaction with such content by members that are "close" to the user (e.g., members that are "friends" or "friends of friends").

The mobile computing device 410 may access a personal set of contacts 476 through network 450. Each contact may identify an individual and include information about that individual (e.g., a phone number, an email address, and a birthday). Because the set of contacts is hosted remotely to the mobile computing device 410, the user may access and maintain the contacts 476 across several devices as a common set of contacts.

The mobile computing device 410 may access cloud-based application programs 478. Cloud-computing provides application programs (e.g., a word processor or an email program) that are hosted remotely from the mobile computing device 410, and may be accessed by the device 410 using a web browser or a dedicated program. Example cloud-based application programs include GOOGLE DOCS word processor and spreadsheet service, GOOGLE GMAIL webmail service, and PICASA picture manager.

Mapping service 480 can provide the mobile computing device 410 with street maps, route planning information, and satellite images. An example mapping service is GOOGLE MAPS. The mapping service 480 may also receive queries and return location-specific results. For example, the mobile computing device 410 may send an estimated location of the mobile computing device and a user-entered query for "pizza places" to the mapping service 480. The mapping service 480 may return a street map with "markers" superimposed on the map that identify geographical locations of nearby "pizza places."

Turn-by-turn service 482 may provide the mobile computing device 410 with turn-by-turn directions to a user-supplied destination. For example, the turn-by-turn service 482 may stream to device 410 a street-level view of an estimated location of the device, along with data for providing audio commands and superimposing arrows that direct a user of the device 410 to the destination.

Various forms of streaming media 484 may be requested by the mobile computing device 410. For example, computing device 410 may request a stream for a pre-recorded video file, a live television program, or a live radio program. Example services that provide streaming media include YOUTUBE and PANDORA.

A micro-blogging service 486 may receive from the mobile computing device 410 a user-input post that does not identify recipients of the post. The micro-blogging service 486 may disseminate the post to other members of the micro-blogging service 486 that agreed to subscribe to the user.

A search engine 488 may receive user-entered textual or verbal queries from the mobile computing device 410, determine a set of internet-accessible documents that are responsive to the query, and provide to the device 410 information to display a list of search results for the responsive documents. In examples where a verbal query is received, the voice recognition service 472 may translate the received audio into a textual query that is sent to the search engine.

These and other services may be implemented in a server system 490. A server system may be a combination of hardware and software that provides a service or a set of services.

For example, a set of physically separate and networked computerized devices may operate together as a logical server system unit to handle the operations necessary to offer a service to hundreds of individual computing devices.

Figure 5:
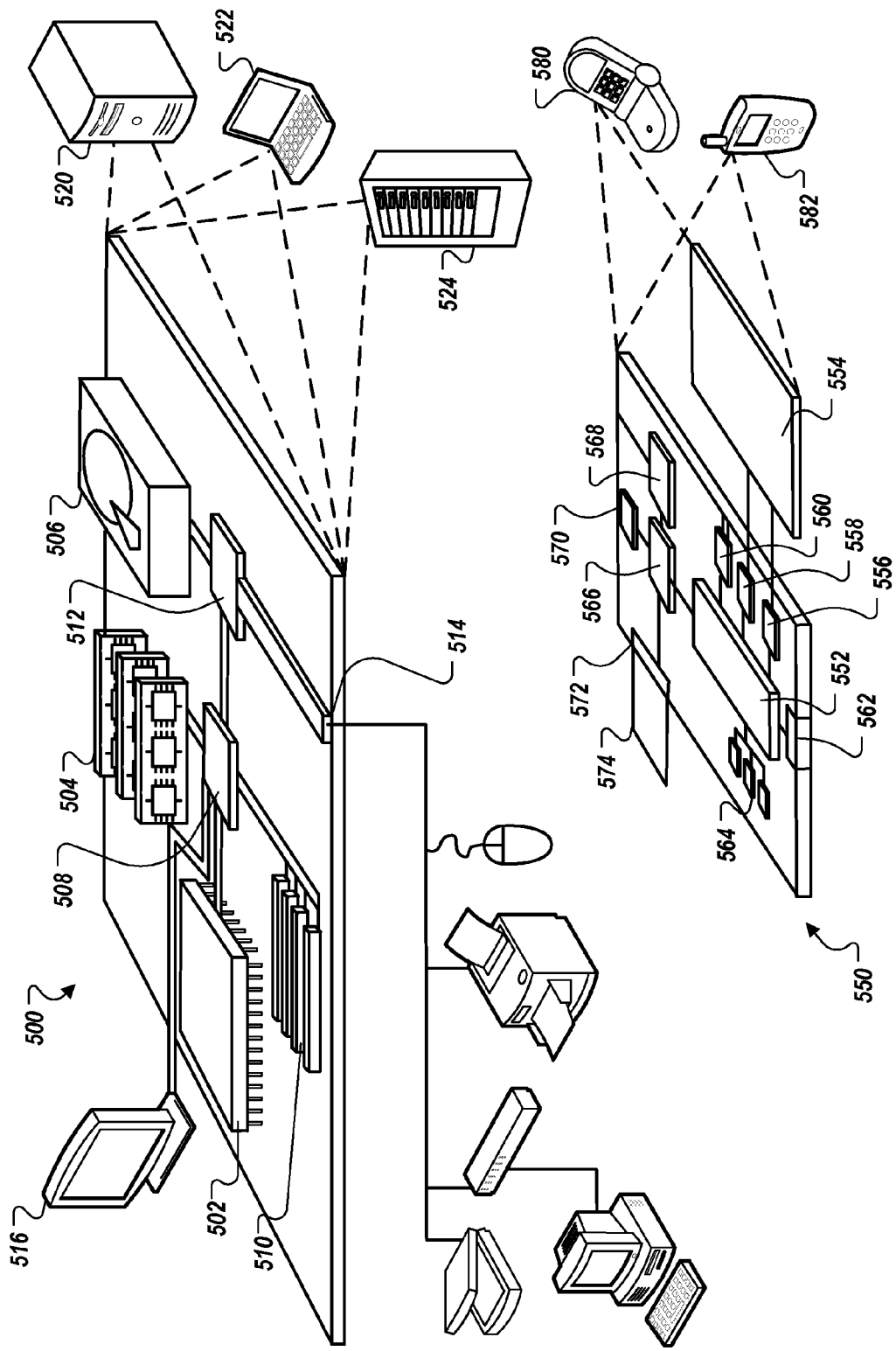
FIG. 5 is a block diagram of computing devices that may be used to implement the systems and methods described in this document, as either a client or as a server or plurality of servers.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other actions may be provided, or actions may be eliminated, from the described flows, and other components may be added to, or removed from, the described systems. Accordingly, other implementations are within the scope of the following claims.

What is claimed is:

1. A computer-implemented method for sending media files to a computing device, the method comprising: storing, at a server system, a media library associated with a user, the media library including at least one media file; receiving, at the server system, a request from a first computing device for the media file from the media library, wherein the first computing device sent the request in response to the user selecting the media file for output by the first computing device; determining, at the server system, whether the media file is stored on a second computing device that is able to send the media file to the first computing device across a local network connecting the first computing device and the second computing device; if the determination indicates that the media file is not stored on a second computing device that is able to send the stored media file to the first computing device across a local network connecting the first computing device and the second computing device, sending the media file to the first computing device from the server system such that the first computing device is able to output the media file to the user; and if the determination indicates that the media file is stored on a second computing device that is able to send the stored media file to the first computing device across a local network connecting the first computing device and the second computing device, sending, from the server system to the first computing device or the second computing device, an instruction that causes the second computing device to send the media file to the first computing device across the local network such that the first computing device is able to output the media file to the user; further comprising: determining that the second computing device has sent an initial portion of the media file to the first computing device across the local network but is unable to send a remaining portion of the media file to the first computing device across the local network; and in response to determining that the second computing device is unable to send the remaining portion of the media file to the first computing device across the local network, sending, from the server system, the remaining portion of the media file to the first computing device.

2. The method of claim 1 further comprising: determining whether the user of the first computing device and a user of the second computing device have both opted into a service that provides for the sending of requested media items between devices on local networks when available rather than sending the requested media items from the server system.

3. The method of claim 1 wherein the second computing device is unable to send the remaining portion of the media file to the first computing device across the local network because the second computing device is disconnected from the local network.

4. The method of claim 1 wherein the first computing device sent the request for the media item across a cellular network that is not a part of the local network.

5. The method of claim 4 wherein the local network is a non-cellular, wireless local area network.

6. The method of claim 4 wherein the local network is an isolated local network.

7. The method of claim 1 wherein the first computing device sent the request to the server system across the local network and one or more intermediary networks connecting the local network to a network that includes the server system.

8. The method of claim 1 wherein determining, at the server system, whether the media file is stored on a second computing device that is able to send the media file to the first computing device across a local network connecting the first computing device and the second computing device includes determining that the first computing device and the second computing device are connected to the local network.

9. The method of claim 1 wherein determining, at the server system, whether the media file is stored on a second computing device that is able to send the media file to the first computing device across a local network connecting the first computing device and the second computing device includes determining that the first computing device and the second computing device are located within a defined geographic proximity such that a wireless local area network is able to be established between the first computing device and the second computing device.

10. A system comprising: a first computing device configured to send a request to a server system for a media file; a second computing device storing the media file; a local network connecting the first computing device and the second computing device; and a server system configured to: receive the request from the first computing device; determine that the media file is stored on the second computing device determine that the second computing device is able to send the media file to the first computing device across the local network; in response to determining that the media file is stored on the second computing device and that the second computing device is able to send the media file to the first computing device across the local network, send, to the first computing device or the second computing device, an instruction that causes the second computing device to send the media file to the first computing device across the local network such that the first computing device is able to output the media file to the user; wherein the server system is further configured to: determine that the second computing device has sent an initial portion of the media file to the first computing device across the local network but is unable to send a remaining portion of the media file to the first computing device across the local network; and in response to determining that the second computing device is unable to send the remaining portion of the media file to the first computing device across the local network, send the remaining portion of the media file to the first computing device.

11. The system of claim 9 wherein the media file is stored at the server system as part of a media library associated with a user of the first computing device.

12. The system of claim 10 wherein the first computing device sent the request in response to the user selecting the media file for output by the first computing device.

13. The system of claim 9 wherein the server system is further configured to: determine whether the user of the first computing device and a user of the second computing device have both opted into a service that provides for the sending of requested media items between devices on local networks when available rather than sending the requested media items from the server system.

14. The system of claim 13 wherein the second computing device is unable to send the remaining portion of the media file to the first computing device across the local network because the second computing device is disconnected from the local network.

15. The system of claim 9 wherein the first computing device sent the request for 115 the media item across a cellular network that is not a part of the local network.

16. A computer readable storage device storing instruction that, when executed by one or more processing devices, cause the one or more processing devices to: store, at a server system, a media library associated with a user, the media library including at least one media file; receive, at the server system, a request from a first computing device for the media file from the media library, wherein the first computing device sent the request in response to the user selecting the media file for output by the first computing device; determine, at the server system, whether the media file is stored on a second computing device that is able to send the media file to the first computing device across a local network connecting the first computing device and the second computing device; if the determination indicates that the media file is not stored on a second computing device that is able to send the stored media file to the first computing device across a local network connecting the first computing device and the second computing device, send the media file to the first computing device from the server system such that the first computing device is able to output the media file to the user; and if the determination indicates that the media file is stored on a second computing device that is able to send the stored media file to the first computing device across a local network connecting the first computing device and the second computing device, send, from the server system to the first computing device or the second computing device, an instruction that causes the second computing device to send the media file to the first computing device across the local network such that the first computing device is able to output the media file to the user; further comprising: determining that the second computing device has sent an initial portion of the media file to the first computing device across the local network but is unable to send a remaining portion of the media file to the first computing device across the local network; and in response to determining that the second computing device is unable to send the remaining portion of the media file to the first computing device across the local network, sending, from the server system, the remaining portion of the media file to the first computing device.

17. A computer-implemented method for sending media files to a computing device, the method comprising: sending from a first computing device to a server system storing a media library associated with a user, a request for a media file in the media library such that, upon receiving the request, the server system: determines whether the media file is stored on a second computing device that is able to send the media file to the first computing device across a local network connecting the first computing device and the second computing device; if the determination indicates that the media file is not stored on a second computing device that is able to send the stored media file to the first computing device across a local network connecting the first computing device and the second computing device, send the media file to the first computing device such that the first computing device is able to output the media file to the user; and if the determination indicates that the media file is stored on a second computing device that is able to send the stored media file to the first computing device across a local network connecting the first computing device and the second computing device, send, to the first computing device or the second computing device, an instruction that causes the second computing device to send the media file to the first computing device across the local network such that the first computing device is able to output the media file to the user; further comprising: determining that the second computing device has sent an initial portion of the media file to the first computing device across the local network but is unable to send a remaining portion of the media file to the first computing device across the local network; and in response to determining that the second computing device is unable to send the remaining portion of the media file to the first computing device across the local network, sending, from the server system, the remaining portion of the media file to the first computing device.

18. A computer readable storage device storing instruction that, when executed by one or more processing devices, cause the one or more processing devices to: send from a first computing device to a server system storing a media library associated with a user, a request for a media file in the media library such that, upon receiving the request, the server system: determines whether the media file is stored on a second computing device that is able to send the media file to the first computing device across a local network connecting the first computing device and the second computing device; if the determination indicates that the media file is not stored on a second computing device that is able to send the stored media file to the first computing device across a local network connecting the first computing device and the second computing device, send the media file to the first computing device such that the first computing device is able to output the media file to the user; and if the determination indicates that the media file is stored on a second computing device that is able to send the stored media file to the first computing device across a local network connecting the first computing device and the second computing device, send, to the first computing device or the second computing device, an instruction that causes the second computing device to send the media file to the first computing device across the local network such that the first computing device is able to output the media file to the used; further comprising: determining that the second computing device has sent an initial portion of the media file to the first computing device across the local network but is unable to send a remaining portion of the media file to the first computing device across the local network; and in response to determining that the second computing device is unable to send the remaining portion of the media file to the first computing device across the local network, sending, from the server system, the remaining portion of the media file to the first computing device.

* * * * *

UNITED STATES PATENT AND TRADEMARK OFFICE
CERTIFICATE OF CORRECTION

PATENT NO. : 8,352,576 B2  Page 1 of 1
APPLICATION NO. : 12/946732
DATED : January 8, 2013
INVENTOR(S) : David L. Sparks It is certified that error appears in the above-identified patent and that said Letters Patent is hereby corrected as shown below:

In the Claims

Column 21, line 9, claim 1, after "user;" please delete "and";
Column 21, line 19, claim 1, after "user;" please delete "further comprising:";
Column 21, line 56, claim 8, after "second" please delete "6o";
Column 22, line 18, claim 10, after "user;" please delete "wherein the server system is further configured to:";
Column 22, line 28, claim 11, please delete "claim 9" and insert therefor -- claim 10 --;
Column 22, line 31, claim 12, please delete "claim 10" and insert therefor -- claim 11 --;
Column 22, line 34, claim 13, please delete "claim 9" and insert therefor -- claim 10 --;
Column 22, line 41, claim 14, please delete "claim 13" and insert therefor -- claim 10 --;
Column 22, line 46, claim 15, please delete "claim 9" and insert therefor -- claim 10 --;
Column 22, line 47, claim 15, after "for" please delete "115";
Column 23, line 1, claim 16, after "user;" please delete "and";
Column 23, line 11, claim 16, after "user;" please delete "further comprising:";
Column 23, line 11, claim 16, before "that" please delete "determining" and insert therefor -- determine --;
Column 23, lines 14-15, claim 16, please delete "computing:" and insert therefor -- computing --;
Column 23, line 36, claim 17, after "user;" please delete "and";
Column 23, line 45, claim 17, after "user;" please delete "further comprising:";
Column 23, line 45, claim 17, please delete "determining" and insert therefor -- determines --;
Column 24, line 26, claim 18, after "user;" please delete "and";
Column 24, line 34, claim 18, please delete "used;" and insert therefor -- user; --;
Column 24, line 35, claim 18, after "used;" please delete "further comprising:"; and
Column 24, line 35, claim 18, before "that" please delete "determining" and insert therefor -- determines --.

Signed and Sealed this
Seventh Day of May, 2013

Teresa Stanek Rea
*Acting Director of the United States Patent and Trademark Office*